United States Patent [19]

Hinrichs

[11] Patent Number: 4,505,180
[45] Date of Patent: Mar. 19, 1985

[54] HIGH REVERSE PRESSURE RESISTANT LOW FORWARD BURST PRESSURE RUPTURE DISC ASSEMBLY

[75] Inventor: James O. Hinrichs, Odessa, Mo.

[73] Assignee: Fike Metal Products Corporation, Blue Springs, Mo.

[21] Appl. No.: 553,258

[22] Filed: Nov. 18, 1983

[51] Int. Cl.³ .................. F41F 3/04; F16K 17/40; B65B 25/00

[52] U.S. Cl. .................. 89/8; 137/68 R; 220/89 A

[58] Field of Search .......... 89/1.703, 1.704, 8, 89/1 R; 220/89 A; 137/68 R, 68 A, 69, 797; 222/541

[56] References Cited

U.S. PATENT DOCUMENTS

| | | | |
|---|---|---|---|
| 2,523,068 | 9/1950 | Simpson et al. | 220/89 A |
| 3,109,553 | 11/1963 | Fike et al. | 220/89 A X |
| 3,123,250 | 3/1964 | Lemmer | 220/89 A |
| 3,445,032 | 5/1969 | Raidl et al. | 220/89 A |
| 3,698,598 | 10/1972 | Wood et al. | 137/68 R X |
| 3,722,734 | 3/1973 | Raidl | 220/89 A |
| 3,881,629 | 5/1975 | Shaw et al. | 137/68 R X |
| 3,921,556 | 11/1975 | Wood et al. | 220/89 A X |
| 4,207,913 | 6/1980 | Fike | 220/89 A X |
| 4,434,905 | 3/1984 | Ou et al. | 137/69 X |

Primary Examiner—David H. Brown
Attorney, Agent, or Firm—Schmidt, Johnson, Hovey & Williams

[57] ABSTRACT

A rupture disc assembly is provided having the seemingly inconsistent properties of resisting relatively high burst pressures in one direction, while rupturing upon experiencing relatively low pressures in the opposed direction. The assembly includes a metallic, frangible disc having a low pressure face and an opposed, scored high pressure face, along with an apertured backing member positioned adjacent the low pressure face; the backing member includes webs aligned with the disc scoring which engage the low pressure face and prevent disc rupture under the influence of high burst pressures directed against the remote high pressure face, while permitting disc rupture when the relatively low burst pressures are developed adjacent the low pressure face. The burst regions of the disc preferably include concavo-convex portions, with the convex faces thereof forming a part of the low pressure face and extending into corresponding openings through the adjacent backing member. The assembly finds particular utility in projectiles fired from hand held weapons, in order to sequence and divide the recoil forces developed when the weapon is fired to thus protect the user from injurious recoil forces.

7 Claims, 5 Drawing Figures

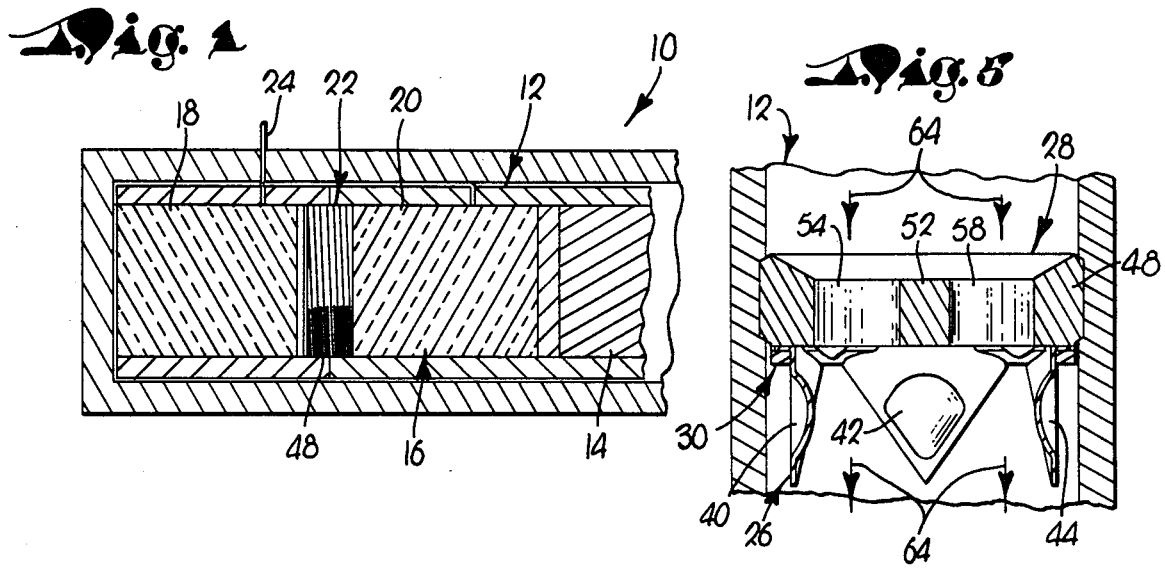
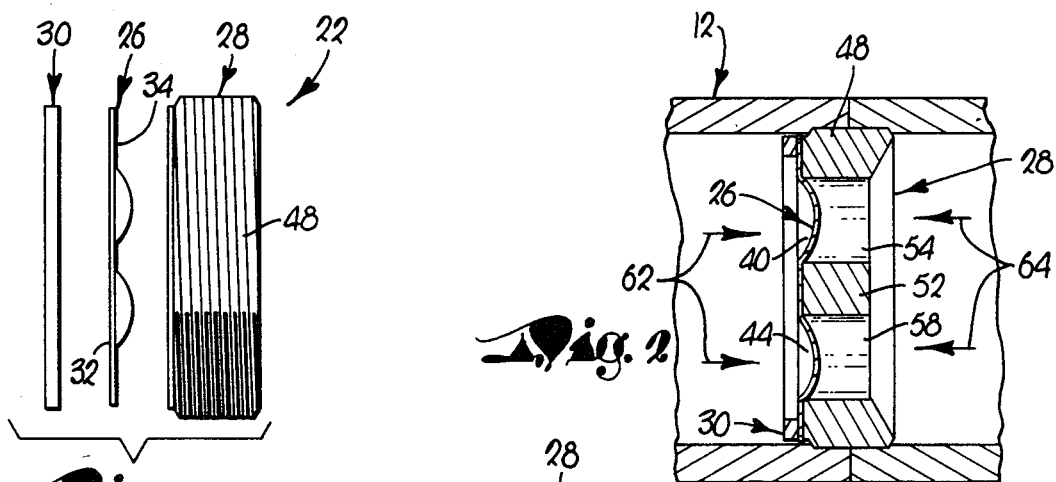
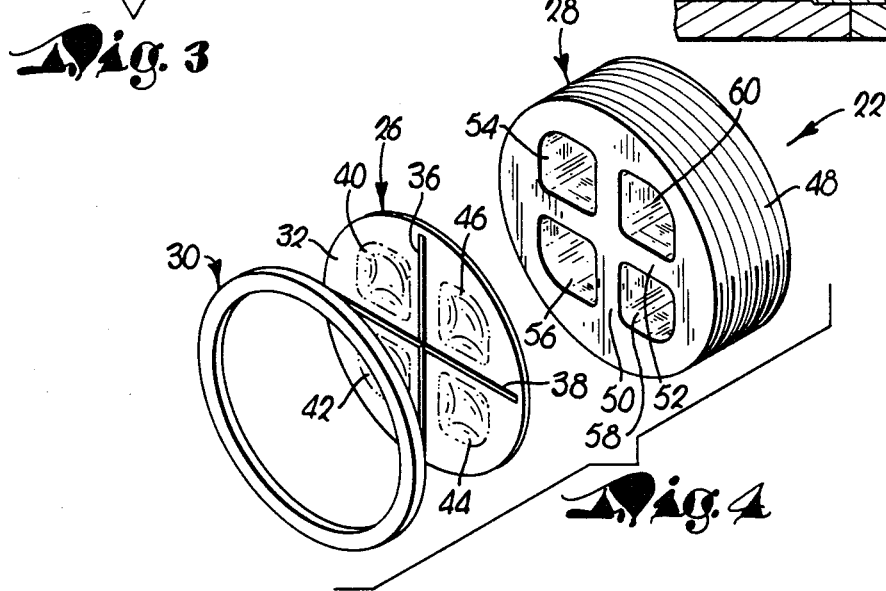

HIGH REVERSE PRESSURE RESISTANT LOW FORWARD BURST PRESSURE RUPTURE DISC ASSEMBLY

BACKGROUND OF THE INVENTION

1. Field of the Invention

The present invention is broadly concerned with a rupture disc assembly having the characteristics of resistance to high burst pressures in one direction, while permitting rupturing under the influence of relatively low burst pressures in the opposite direction. More particularly, it is concerned with such a rupture disc assembly having particular utility in projectiles fired from hand held weapons in order to permit staged ignition of the propellant in the projectile, so that weapon can be used without fear of injuring the user.

2. Description of the Prior Art

Rupture disc assemblies have been used in the past in many contexts requiring rapid discharge or venting of materials. To give but one example, certain types of fire or explosion suppression apparatus include a pressurized tank of suppressant material along with a rupturable disc assembly sealing the material tank; when a hazard is sensed through a remote sensing mechanism, the disc assembly is ruptured, typically through the use of explosive charge, in order to permit the pressurized suppressant material to rapidly pass from the tank and into the area to be protected. Such rupture disc assemblies include a circular, concavo-convex metallic frangible rupture disc, which in many instances is scored to facilitate rupture thereof along predetermined lines of weakness. However, it will be perceived that disc assemblies of the foregoing type are designed to withstand the pressure condition exerted by the material within the suppressant tank, and normally the pressure conditions against the remote face of the frangible disc are at atmospheric or essentially unchanging, and in no event do pressure conditions against this remote face alter the burst characteristics of the overall assembly.

In recent years a number of hand held anti-tank field weapons have been developed for use by infantry troops against tanks or other armored vehicles. Generally speaking, these weapons include an elongated firing tube and firing mechanism, along with armor-piercing projectiles to be fired. The projectiles include a forward armor-piercing head, along with a solid propellant which is ignited when the weapon is fired. In order to be effective, such projectiles must achieve relatively high muzzle velocity, and hence the amount and type of propellant used with the projectile is an important consideration. However, in order to achieve desirable muzzle velocities, relatively high recoil forces are likewise necessarily developed. In the case of hand held weapons though, there is a limit to the magnitude of recoil forces which can be absorbed by the user, and this in turn has tended to place a maximum limit upon projectile propellant, and hence muzzle velocity.

SUMMARY OF THE INVENTION

It has now been discovered that a specialized rupture disc assembly can be provided which resists and withstands rupture under relatively high burst pressure conditions directed against one face of the frangible disc thereof, whereas the disc will rapidly rupture upon experiencing reltively low burst pressure against the opposite face thereof. In the context of hand held weapon projectiles, provision of such a rupture disc assembly in the projectile propellant makes it possible to sequence and divide the ignition of a propellant charge, to thereby divide the recoil forces generated during firing of the weapon. This is turn permits the firing personnel to absorb sequentially generated recoil forces which, if generated simultaneously, would be so great as to potentially injure the user.

Broadly speaking, the rupture disc assembly of the invention comprises a frangible metallic disc presenting a low pressure face, an opposed high pressure face, and scoring on the high pressure face disposed at least partially about a rupture region for the disc. A backing member also forms a part of the assembly and is positioned adjacent the low pressure face. The backing member includes rigid web means in substantial alignment with the disc scoring and in close proximity to the low pressure face for engaging and preventing rupturing of the disc under the influence of relatively high burst pressures directed against the high pressure face. The backing member further includes structure defining an opening through the backing member for exposing an area on the low pressure face corresponding to the rupture region, so that such exposed low pressure face area can experience burst pressures. This permits rupturing of the disc along the scoring when relatively low burst pressures are directed against the low pressure face.

In preferred forms, a plurality of disc rupture regions are provided, each including a concavo-convex portion, with the convex faces of the portions forming a part of the overall low pressure face for the disc. Correspondingly, the backing member includes respective openings receiving the concavo-convex portions, with each portion extending into a corresponding backing member opening.

The disc backing member is preferably circular in configuration, with the scoring on the disc comprising a pair of relatively perpendicular score lines each extending substantially the entire diameter of the disc. The supporting webs forming a part of the backing member are advantageously of a width substantially greater than the width of the corresponding disc scoring, in order to provide ample backing support. Similarly, a peripheral support ring is provided in engagement with the outer periphery of the high pressure face, in order to unitize the overall assembly.

BRIEF DESCRIPTION OF THE DRAWING

FIG. 1 is a fragmentary, schematic, vertical sectional view illustrating the firing tube of a hand held weapon, with a projectile situated within the firing tube, the projectile including the rupture disc of the assembly situated between respective portions of the projectile propellant;

FIG. 2 is an enlarged vertical sectional view similar to that of FIG. 1 and illustrating the details of construction of the disc assembly;

FIG. 3 is an exploded side view of the components making up the preferred rupture disc assembly;

FIG. 4 is an exploded perspective view which further depicts the components of the preferred rupture disc assembly; and FIG. 5 is a sectional view similar to that of FIG. 2, but illustrates the burst assembly in a ruptured condition.

DESCRIPTION OF THE PREFERRED EMBODIMENT

Turning now to the drawing, the firing tube 10 of a hand held weapon is illustrated schematically in FIG. 1. The tube 10 houses an elongated, circular in cross section projectile 12 including a fragmentarily illustrated forward portion 14, as well as a propellant portion 16 including an initial propellant charge 18 and a secondary propellant charge 20. The charges 18, 20, are separated within portion 16 by means of a rupture disc assembly 22. Moreover, the tube 10 and projectile 12 include conventional means 24 for ignition and firing of the charges 18, 20, in sequence. That is to say, during firing of projectile 12 as will be described, initial charge 18 is first ignited and, a short time later, the secondary charge 20 is fired. It will also be understood that the structure depicted in FIG. 1 is entirely schematic in nature, and is intended to merely illustrate the preferred environment of use for the rupture disc assembly 22.

Referring now to FIGS. 2-5, it will be seen that the assembly 22 includes a frangible metallic burst disc 26, a metallic, apertured backing member 28 for the disc 26, and a peripheral support ring 30.

In more detail, the disc 26 is circular in overall configuration, and presents a high pressure face 32 and an opposed low pressure face 34. The high pressure face 32 is provided with scoring advantageously in the form of a pair of relatively perpendicular, rectilinear score lines 36, 38 which each extend substantially the entire diameter of the disc. In addition, the overall disc 26 includes four concavo-convex portions 40-46 which are respectively located in the burst region quadrants defined by the score lines 36, 38 (see FIG. 4). The convex faces of each of the portions 40, 46 form a part of the overall low pressure face 34, whereas the concave faces thereof form a part of overall high pressure face 32. In preferred forms, the disc 26 is formed of nickel, although other metals could be employed in this context.

The backing member 28 includes a threaded sidewall 48 permitting installation of assembly 22 within projectile 12, a pair of intersecting, relatively perpendicular, elongated web sections 50, 52, and a total of four openings 54-60 therethrough.

Support ring 30 is simply a circular metallic ring which is configured to abut the outer periphery of disc 26 in order to sandwich the latter between the ring 30 and backing member 28.

The overall assembly 22 is constructed so that the flat face of backing member 28 engages and supports the low pressure face 34 of disc 26. As will be seen from a consideration of FIGS. 2 and 4, the relatively wide, flattened faces of the web sections 50, 52 correspond with and extend along the length of the score lines 36, 38 on remote high pressure face 32 of disc 26. In addition, each of the concavo-convex portions 40-46 is received within a respective, complementally configured opening 54-60 of backing member 28 so that the respective convex faces of the portions 40-46 extend into the corresponding backing member openings 54-60.

The overall construction of the assembly 20 is completed by provision of support ring 30 which engages the outer periphery of face 32. The ring is fixed in place by means of welding, such serving to integrate the three components of the assembly as depicted in FIGS. 2 and 5.

In use, assembly 22 is positioned within projectile 12 between the initial and secondary propellant charges 18, 20. Specifically, the assembly 22 is located so that the high pressure face 32 of disc 26 faces initial charge 18, whereas low pressure face 34 faces secondary charge 20.

In the use of projectile 12 including the disc assembly 22, the initial propellant charge 18 is first ignited via the ignition means 24. This in turn develops relatively high burst pressures within the initial charge zone, and this initiates the propulsion of projectile 12 out of tube 10. However, during this sequence the disc 26 of assembly 22 remains intact and does not burst. This is accomplished (see FIG. 2 wherein the arrows 62 indicate the pressures developed upon ignition of initial charge 18) by virtue of the fact that backing member 26 supports the critical rupture areas on the disc. Specifically, the outer circular periphery of the backing member 28 is in direct engagement with the corresponding peripheral edge of the disc 26, and more important the web sections 50, 52 directly engage the face 34 of disc 26 at those regions corresponding to score lines 36, 38. Inasmuch as the web sections 50, 52 have a significantly greater width than the corresponding score lines 36, 38, it will be seen that adequate support is provided to withstand the relatively high burst pressures (on the order of 7,000 psig) developed upon ignition of initial charge 18.

Within a very short time after initial charge 18 is ignited, a secondary charge 20 is ignited through means 24. This in turn serves to develop a burst pressure within the corresponding charge chamber, with the result that burst pressure (denoted by the arrows 64 in FIGS. 2 and 5) is directed against the convex faces of the portions 40-46 situated within the respective backing member openings 54-60. Such pressure build-up (on the order of 230 psig) serves to quickly burst disc 26 along the score lines 36, 38 as indicated in FIG. 5. This occurs very rapidly, and is not hindered by the presence of any backing or reinforcing structure adjacent high pressure face 32, which will be readily seen. In any event, opening of the disc 26 along the score lines 36, 38 serves to quickly vent products of combustion from secondary charge 20 through openings 54-60, and ultimately out the chamber housing initial charge 18, so that the desired muzzle velocity for projectile 12 can be achieved. At the same time, it will be seen that use of the assembly 22 serves to sequence and divide the recoil forces developed by virtue of sequenced ignition of the overall propellant charge 16, to thereby spread the recoil forces concomitantly developed in a manner to prevent injury to the user.

It will also be seen that the disc assembly of the invention can be used in many other contexts where it is desirable to provide resistance to high burst pressures in one direction, while permitting bursting under the influence of relatively low pressures in the opposite direction.

I claim:

1. A rupture disc assembly, comprising:
   a frangible disc presenting a low pressure face, an opposed high pressure face, and scoring on said high pressure face disposed at least partially about a rupture region for the disc; and
   a backing member adjacent said low pressure face, including:
   web means in substantial alignment with said scoring and in close proximity to said low pressure face for preventing rupturing of said disc under the influence of relatively high burst pressures directed against said high pressure face; and structure defining an opening through said backing member for exposing an area on said low pressure face corresponding to said rupture region to burst pressures, and for rupturing of said disc along said scoring under the influence of relatively low burst pressures directed against said low pressure face.

2. The assembly of claim 1, said rupture region including a concavo-convex portion, the convex face of said portion forming a part of said low pressure face.

3. The assembly of claim 1, including a peripheral support ring in engagement with the outer periphery of said high pressure face.

4. The assembly of claim 1, there being a plurality of burst regions on said disc, said backing member having an opening therethrough for each burst region.

5. The assembly of claim 4, each of said burst regions having a concavo-convex face of each portion extending into the corresponding backing member opening.

6. The assembly of claim 1, said disc and backing member being circular, said scoring comprising a pair of relatively perpendicular score lines.

7. The assembly of claim 1, said web members being in engagement with said low pressure face.

* * * * *